United States Patent [19]
Gove et al.

[11] Patent Number: 5,398,071
[45] Date of Patent: Mar. 14, 1995

[54] FILM-TO-VIDEO FORMAT DETECTION FOR DIGITAL TELEVISION

[75] Inventors: Robert J. Gove; Richard C. Meyer, both of Plano; Stephen W. Marshall, Richardson, all of Tex.

[73] Assignee: Texas Instruments Incorporated, Dallas, Tex.

[21] Appl. No.: 145,934

[22] Filed: Nov. 2, 1993

[51] Int. Cl.[6] .............................. H04N 7/01
[52] U.S. Cl. ........................ 348/558; 348/443
[58] Field of Search ............ 348/558, 448, 443, 97, 348/449, 459, 911; H04N 7/01

[56] References Cited

U.S. PATENT DOCUMENTS

| | | | |
|---|---|---|---|
| 4,982,280 | 1/1991 | Lyon et al. | 348/459 |
| 5,166,781 | 11/1992 | Walby et al. | 348/558 |

OTHER PUBLICATIONS

*Program for 135th Society of Motion Picture and Television Engineers Conference and Equipment Exhibit,* Oct. 29–Nov. 2, 1993, L.A. Convention Center, Los Angeles, Calif., p. 11.

R. L. Garman and R. W. Lee, "Image Tubes and Techniques in Television Film Camera Chains", *Journal of the SMPTE,* vol. 56, Jan. 1951, pp. 52–64.

B. R. Mason and R. N. Robinson, "Applications of Motion Compensation to Standards Conversion and Film Transfer", *SMPTE Journal,* Sep. 1993, pp. 786–790.

*Primary Examiner*—Victor R. Kostak
*Attorney, Agent, or Firm*—Julie L. Reed; James C. Kesterson; Richard L. Donaldson

[57] ABSTRACT

A film-to-video format detector (24) for a digital television receiver (10). The detector (24) receives pixel data from a current field and a second preceding field. It determines a set of pixel difference values, sums them to obtain a field difference value, and compares the field difference value to a threshold. These steps are repeated to obtain a series of field difference indicators. This series is analyzed to determine whether it has a pattern corresponding to a film-to-video format.

20 Claims, 2 Drawing Sheets

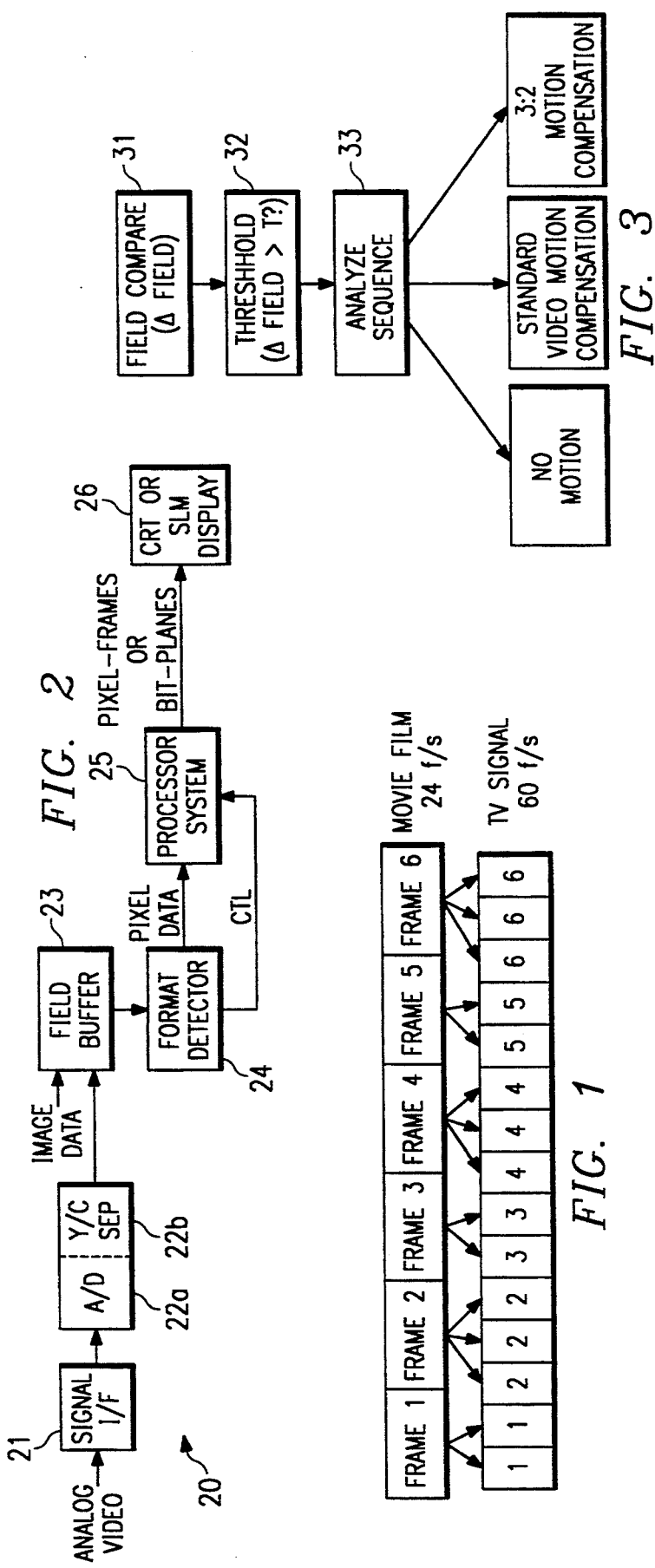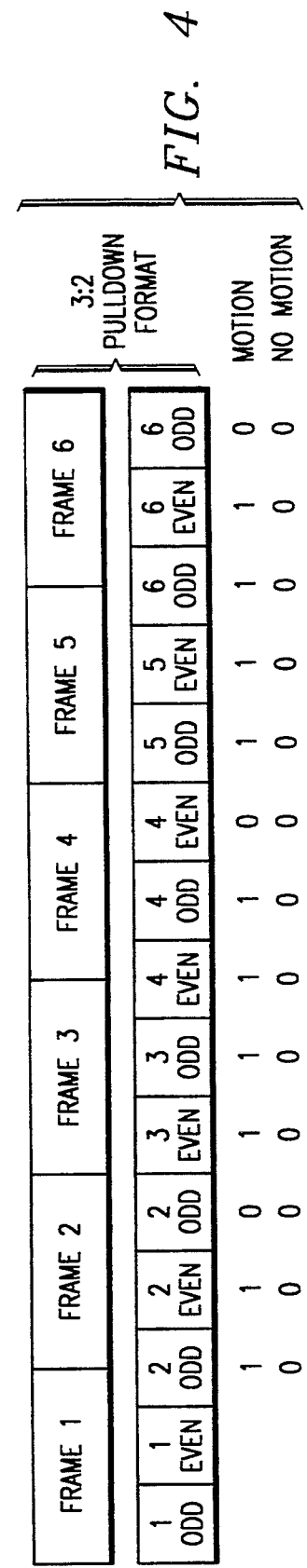

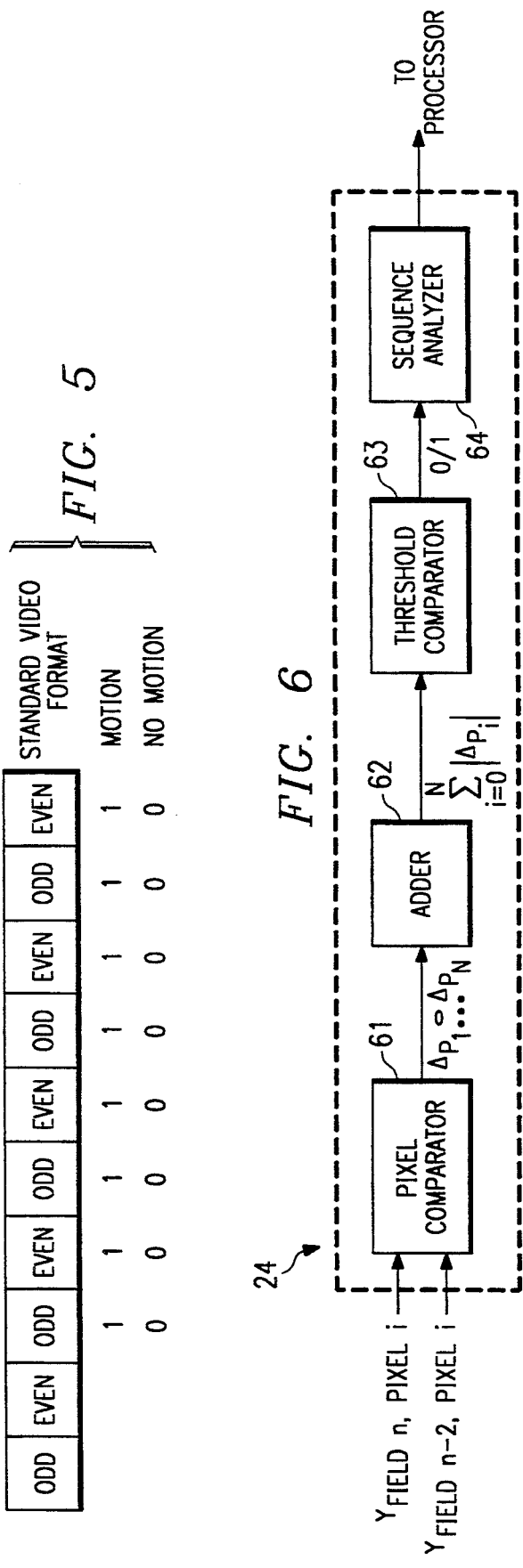
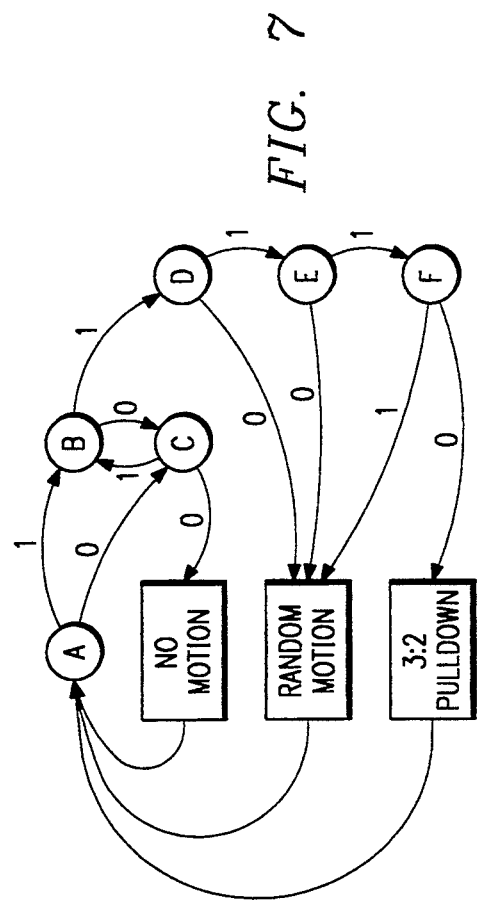

FILM-TO-VIDEO FORMAT DETECTION FOR DIGITAL TELEVISION

TECHNICAL FIELD OF THE INVENTION

This invention relates to television receivers, and more particularly to a receiver that detects when an incoming television signal is formatted by means of a film conversion process.

BACKGROUND OF THE INVENTION

It is often desired to display a movie originally recorded on film by means of a television broadcast. In order to comply with television broadcast field rates, some sort of film-to-video conversion must be performed.

Typically, a movie is recorded and displayed at a frame rate of 24 frames per second. However, television broadcasts use a different rate, such as the 59.94 field per second rate of the NTSC standard where every two fields are interlaced and comprise one frame.

One method of converting film rates to television field rates is referred to as the "3:2 pulldown" scanning method. A first film frame is scanned twice, then a second film frame is scanned three times, the next frame twice, etc. To accommodate the fact that the NTSC vertical scan period is slightly less than 60 fields per second, the actual display rate may be slowed slightly.

At the receiving end of television broadcasts, a recent development has been the conversion of the incoming television signal into digital data for processing. The processing includes compensation to overcome the visual artifacts perceived by the viewer as a result of motion in the scene being displayed. Although various processing techniques have been developed for compensating the effects of motion between interlaced television fields, these methods are not designed for film-to-video formats. It is therefore necessary to detect when an incoming signal has a 3:2 pulldown format so that appropriate motion compensation processing can be performed.

SUMMARY OF THE INVENTION

One aspect of the invention is a format detector for a digital television receiver of a video input signal. A pixel comparator compares pixel data values of pixels of a current field with corresponding data values of a second preceding field, thereby obtaining a set of pixel difference values. An adder receives the set of pixel difference values and sums their absolute values, thereby obtaining a field difference value. A threshold comparator compares the field difference value to a predetermined threshold, and generates a field difference indicator value. A sequence analyzer determines whether a series of field difference indicator values follows a recognizable sequence.

A technical advantage of the invention is that it permits television data processing to be optimized for the format of the incoming data. The invention is useful for any television signal representing film that has been scanned such that the frames are repeated in a sequence to result in a desired movie-frame to video-field ratio.

A format detector in accordance with the invention can be easily integrated with motion detection logic used for de-interlacing algorithms of standard television formats. This permits a digital processor to perform real-time switching to whatever pixel processing algorithm is most appropriate for the data being received.

BRIEF DESCRIPTION OF THE DRAWINGS

FIG. 1 illustrates a segment of a movie film being scanned for broadcast as an NTSC television signal.

FIG. 2 is a block diagram of the basic components of a digital television receiver.

FIG. 3 illustrates the basic steps of detecting a 3:2 pulldown format.

FIG. 4 illustrates patterns of field difference indicators resulting from a 3:2 pulldown format.

FIG. 5 illustrates patterns of field difference indicators resulting from standard video format.

FIG. 6 is a block diagram of a format detector.

FIG. 7 is a state diagram illustrating how a series field difference indicators is analyzed.

DETAILED DESCRIPTION OF THE INVENTION

FIG. 1 illustrates a segment of movie film being scanned for broadcast as an NTSC television signal. As indicated, the film displays 24 frames per second. Frame 1 has been scanned twice to make two fields of the television signal. Frame 2 has been scanned three times, Frame 3 twice, etc. The result is a television signal having 60 frames per second, which approximates the 59.94 field per second rate of the standard NTSC format. This process is referred to as "3:2 pulldown scanning".

Although the above description is in terms of 3:2 pulldown scanning to an NTSC television signal, the same concepts apply to scanning movie films to other television formats. For example, for a PAL broadcast of 50 fields per second, a film-to-video ratio of 2 television fields per movie frame might be used. For this reason, the 3:2 pulldown scan format is referred to generally herein as a "film-to-video format", characterized by the fact that source image frames are scanned in a periodic sequence that results in a desired frame-to-field ratio. In the example of this description, the desired ratio is:

$$\frac{60}{24} = \frac{5}{2}.$$

For integer frame numbers, this is equivalent to five frames for every two fields, with the best symmetry being accomplished with 3:2 pulldown scanning.

Motion in the scene that was originally filmed is indicated if there is a change between adjacent fields. Those fields that represent the same movie frame will have no motion. However, at every boundary where a different movie frame has been scanned, the scene may change and there can be motion.

When the television receiver includes digital processing components, some sort of motion compensation processing can be performed to prevent the viewer from perceiving visual artifacts. However, the best type of processing depends on the format of the digitized television signal. In other words, the same processing algorithm might not be the best algorithm for data that represents 3:2 pulldown format as would be used for standard NTSC data.

FIG. 2 is a block diagram of the basic components of a digital television receiver 20. Only those components significant to main-screen pixel data processing are shown. Other components, such as might be used for processing synchronization and audio signals or secondary screen features, such as closed captioning, are not shown.

A comprehensive description of a DMD-based digital television system is set out in U.S. Pat. No. 5,079,544, entitled "Standard Independent Digitized Video System", and in U.S. patent Ser. No. 08/147,249, entitled "Digital Television System", both assigned to Texas Instruments Incorporated, and both incorporated herein by reference.

U.S. patent Ser. No. 07/678,761, entitled "DMD Architecture and Timing for Use in a Pulse-Width Modulated Display System", describes a method of formatting video data for use with a DMD-based display system and a method of modulating bit-planes to provide varying pixel brightness. The use of a DMD-based display system with a color wheel to provide sequential color images is described in U.S. patent Ser. No. 07/809,816, entitled "White Light Enhanced Color Field Sequential Projection". These patent applications are assigned to Texas Instruments Incorporated, and incorporated herein by reference.

As an overview of the operation of receiver 20, signal interface unit 21 receives an analog video signal and separates video, synchronization, and audio signals. It delivers the video signal to A/D converter 22a. The data is then delivered to Y/C separator 22b, which separates the luminance ("Y") data from the chrominance ("C") data. In FIG. 2, the signal is converted to digital data before Y/C separation, but in other embodiments, Y/C separation could be performed before A/D conversion, using analog filters. The separated Y and C data are delivered to field buffer 23.

As indicated in FIG. 2, receiver 20 is also capable of receiving a stream of video data. In this case, the data is delivered to field buffer 23, without the need for sampling or color separation.

As explained below, the determination of whether there is motion between two fields requires a comparison of pixel data from a current field with pixel data from a second preceding field. Field buffer 23 permits preceding-field data to be stored while current-field data is incoming. Because the incoming data might represent interlaced fields, field buffer 23 has a capacity to store three fields so that pixel data from a current field can be compared to pixel data from a second preceding field. For purposes of this description, these fields are identified as follows:

current field     $field_n$
second preceding     $field_{n-2}$.

Format detector 24 receives preceding-field data from field buffer 23 and current field data from Y/C separator 22b. Format detector 24 is constructed and operated in accordance with the invention, and further described below in connection with FIGS. 4–7. Format detector 24 delivers a control signal to processor system 25 that indicates whether the incoming data represents a moving scene and whether it has a 3:2 pulldown format.

Processing system 25 performs various pixel data processing tasks. These tasks include motion compensation, with the appropriate algorithm depending on the format of the data, as indicated by the control signal from format detector 24. In general, the motion compensation algorithms appropriate for standard NTSC data are not appropriate for film-to-video data. Thus, the control signal from format detector 24 controls processor system 25 so that it performs an appropriate algorithm.

In addition to movie motion compensation or deinterlacing, processor system 25 performs other processing tasks to prepare the pixel data for display. These tasks may include scaling, color space conversion, and picture quality control. Although not explicitly shown in FIG. 2, processor system 25 includes whatever memory is required for proper operation, including a frame memory for providing display-ready data to display system 26.

Display system 26 could be a standard CRT display system, in which case the pixel-frame data is converted to analog form for scanning to the display screen. Alternatively, display system 26 could be a spatial light modulator (SLM) system, in which the display device has an array of pixel elements that can emit or reflect light simultaneously. For SLM displays, each image frame is generated by addressing pixel elements rather than by scanning a CRT screen. Image frames are time-divided into bit-planes, where each bit-plane represents pixel values of the same bit weight. For example, where the pixel data has 24 bits, 8 bits for each color, there would be 8 bit-planes for each color. The color data can be displayed sequentially with a color wheel or combined from multiple SLMs. A type of SLM is the digital micro-mirror device (DMD) developed by Texas Instruments Incorporated. Details of a suitable DMD are described in U.S. Pat. No. 4,956,619, entitled "Spatial Light Modulator", assigned to Texas Instruments Incorporated, which is incorporated by reference herein.

FIG. 3 illustrates the basic steps of the invention. In step 31, pixel values of a current field and a second preceding field are compared. A field difference value greater than zero indicates a change between the fields being compared. In step 32, the field difference value is compared to a threshold value, T, to make sure that the change is not due simply to noise. The result of step 32 is a field difference indicator. For purposes of this description, a field indicator value of "1" represents a change between the current field and the second preceding field. An indicator value of "0" represents no change between these fields. Steps 31 and 32 are repeated to obtain a series of field indicators.

In step 33, the series of field indicators is analyzed. As explained below, the result of the analysis is whether the incoming data has a 3:2 pulldown format with motion, a standard format with motion, or either format with no motion. Additional analysis will also indicate whether or not the incoming data has a standard format with motion. As steps 31 and 32 are repeated, step 33 is repeated. In this manner, the analysis is updated as the series changes with changing data.

FIG. 4 illustrates series of field indicators for 3:2 pulldown, with and without motion. If there is motion, all field indicators are "1" except when the comparison is between two even fields or two odd fields of the same movie frame. Thus, the series follows a 0,1,1,1,1,0,1,1,1,1 ... pattern. When there is no motion, the series has a 0,0,0,0 ... pattern.

FIG. 5 illustrates series of field indicators for standard video, with and without motion. If there is motion, all field indicators are "1". If there is no motion, all field indicators are "0". For standard video that has random periods of motion and no motion, the result will be a random pattern of 0's and 1's.

FIG. 6 illustrates one embodiment of format detector 24. Format detector operates continuously and in real time, so that any format changes in the incoming signal will be detect and a real-time control signal delivered to processor 25. By "real-time" is meant sufficiently fast to as to provide realistically moving images.

Pixel comparator 61 receives two pixel values for the same pixel position. Typically, the pixel values are the luminance (Y) values. In other embodiments of the invention, format detector 25 might use chrominance ("C") as well as, or instead of, luminance data to detect motion. One value is for a current field, and the other for a second preceding field. These values are illustrated as $Y_{field\ n,\ pixel\ i}$ and $Y_{field\ n-2,\ pixel\ i}$, respectively. The i value increments according to the number of pixels per field being compared.

Pixel comparator 61 compares the two pixel values and generates a pixel difference value. For example, where the pixel data represents Y-U-V color space, each pixel is represented by 24 bits of data, 8 of those representing luminance (Y) data. These 8 bits from the current and second preceding fields are compared. Referring again to FIGS. 5 and 6, if there is no motion, all comparisons are between the same odd-field or even-field data, and the field difference value is 0. However, if there is motion, the comparisons are between two different fields, and result in a non-zero pixel difference value, except in the case of every fifth field of data having a 3:2 pulldown format. The absolute value of the pixel difference value may range from 0 to 255. If a dark portion of the scene has moved across a bright background, the pixel difference value might be as high as 255. Or a bright portion might move across a dark background for a pixel difference value as low as $-255$, whose absolute value is 255.

Adder 62 sums the absolute values of the pixel difference values delivered to it by comparator 61. The result is a field difference value, which indicates the level of change, if any, between the current and second preceding fields.

In the embodiment of this description, pixel comparator 61 compares every pixel in the fields and the summation generated by adder 62 is a sum of difference values from every pixel. However, in other embodiments, comparator 61 might compare fewer than every pixel per field. In general, the function of pixel comparator 61 and adder 62 is to deliver a difference value that indicates whether there is motion between fields.

A threshold comparator 63 compares the field difference value to a predetermined threshold. This comparison ensures that the difference value represents more than noise. The output of threshold comparator 63 can be as simple as a "yes/no" signal, which indicates whether there is motion between fields.

Sequence analyzer 64 receives the output of threshold comparator 63 and determines whether the "yes/no" values follow any one or more format patterns. In the example of this description, sequence analyzer 64 might receive a serial string of data with the following pattern: 1,1,1,1,0,1,1,1,1,0 . . . This pattern indicates a 3:2 pulldown format.

The output of sequence analyzer 64 is a format control signal, delivered to processing system 25. This signal indicates the format of the pixel data so that an appropriate pixel processing algorithm can be performed.

FIG. 7 is a state diagram that illustrates one method for analyzing the field indicator values. A first indicator value is received at State A. After State B or State C, a pattern of 0,0 indicates no motion, whereas patterns of 0,1 or 1,0 or 1,1 can indicate either random motion of a standard video format or a 3:2 pulldown format. A field indicator of 0 at State D or State E or a field indicator of 1 at State E eliminates the 3:2 pulldown format and indicates random motion. However, after a series of five field indicators are received at State F, a pattern of 1,1,1,1,0 indicates a 3:2 format.

Another method for analyzing the field indicator values could include a step of storing any five field indicator values in a memory of sequence analyzer 64. Sequence analyzer 64 would then determine whether these five values have any of the following patterns:

0,1,1,1,1
1,0,1,1,1
1,1,0,1,1
1,1,1,0,1
1,1,1,1,0

These patterns indicate that the incoming data has a 3:2 pulldown format.

Other analysis methods could be implemented with sequence analyzer 64. The common characteristic is the recognition of the pattern resulting from comparing current fields and second preceding fields, when the incoming data has a 3:2 pulldown format.

The implementation of the various components of format detector 24 could be as simple as a combination of commercially available logic devices, programmed to perform the logic functions described herein. Or, format detector 24 could be a processor with instruction-based programming. In the latter case, the functions of format detector 24 could be performed by the same processor as used to implement processing system 25.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A format detector for a receiver of a video signal, comprising:

a pixel comparator for comparing data values of pixels of a current field of said video signal with data values of corresponding pixels of a second preceding field of said video signal, thereby obtaining a set of pixel difference values;

an adder for adding together the absolute values of said set of pixel difference values, thereby obtaining a field difference value;

a threshold comparator for comparing said field difference value to a predetermined threshold, thereby generating a binary field difference indicator; and a sequence analyzer for determining whether a series of field difference indicators follows a recognizable pattern.

2. The format detector of claim 1, wherein said pixel comparator is a logic circuit for calculating the difference between two pixel values.

3. The format detector of claim 1, wherein said pixel comparator is a processor programmed to calculate the difference between two pixel values.

4. The format detector of claim 1, wherein said adder is a logic circuit.

5. The format detector of claim 1, wherein said adder is a processor programmed to add the absolute values of said pixel difference values.

6. The format detector of claim 1, wherein said threshold comparator is a logic circuit.

7. The format detector of claim 1, wherein said threshold comparator is a processor programmed to compare said field difference value with said predetermined threshold.

8. The format detector of claim 1, wherein said sequence analyzer is a logic circuit.

9. A method of detecting the format of an incoming video signal, comprising the steps of:
   receiving a first pixel data value from a pixel of a current field of said video signal;
   receiving a second pixel data value from the corresponding pixel of a second preceding field of said video signal;
   calculating the difference between said first and second pixel values to obtain a pixel difference value;
   repeating said receiving steps and said calculating step for a predetermined number of pixels;
   summing the absolute values of the pixel difference values obtained in said repeating step to obtain a field difference value;
   determining whether said field difference value exceeds a predetermined threshold to obtain a binary field difference indicator;
   repeating all of the above steps to obtain a series of field difference indicators for a continuous series of fields; and
   analyzing said series of field difference indicators to determine whether it has a pattern corresponding to a film-to-video conversion.

10. The method of claim 9, wherein said pixel data values are luminance values.

11. The method of claim 9, wherein all of said steps are performed at a real-time image generation rate.

12. The method of claim 9, wherein said receiving and calculating steps are repeated for fewer than the number of pixels per field.

13. The method of claim 9, wherein said analyzing step further determines whether said series of field indicators has a pattern corresponding to a scene having no motion.

14. The method of claim 9, wherein said analyzing step is performed by determining a format state as each field indicator is received.

15. The method of claim 9, wherein said analyzing step is performed by storing a set of consecutive indicators and determining if said set of field indicators matches one or more stored patterns.

16. A digital processing system for a receiver of a video signal, comprising:
   a field buffer for storing pixel data from at least three fields of data of said video signal;
   a format detector for detecting the format of said video signal, wherein said format detector has a pixel comparator for comparing data values of pixels of a current field with data values of corresponding pixels of a second preceding field, thereby obtaining a set of pixel difference values; an adder for adding together the absolute values of said set of pixel difference values, thereby obtaining a field difference value; a threshold comparator for comparing said field difference value to a predetermined threshold, thereby generating a binary field difference indicator; a sequence analyzer for determining whether a series of field difference indicators follows a pattern corresponding to a film-to-video conversion; and
   a processing system for receiving said pixel data and for receiving a format control signal from said format detector, and for processing said pixel data in accordance with said format control signal.

17. The system of claim 16, further comprising an analog to digital converter for converting said video signal to said pixel data.

18. The system of claim 16, further comprising a color separation unit for separating said pixel data into a luminance component and chrominance components.

19. The system of claim 16, wherein said sequence analyzer determines whether said series of field difference indicators has a pattern resulting from a scene with no motion.

20. The system of claim 16, further comprising a spatial light modulator for receiving bit-planes of data from said processing system for display.

* * * * *